Feb. 7, 1933. A. COYNE 1,896,810
REENFORCED AND ANCHORED MASONRY STRUCTURE
Filed April 18, 1930   6 Sheets-Sheet 1

André Coyne
Inventor
by Louis Barnett
Attorney

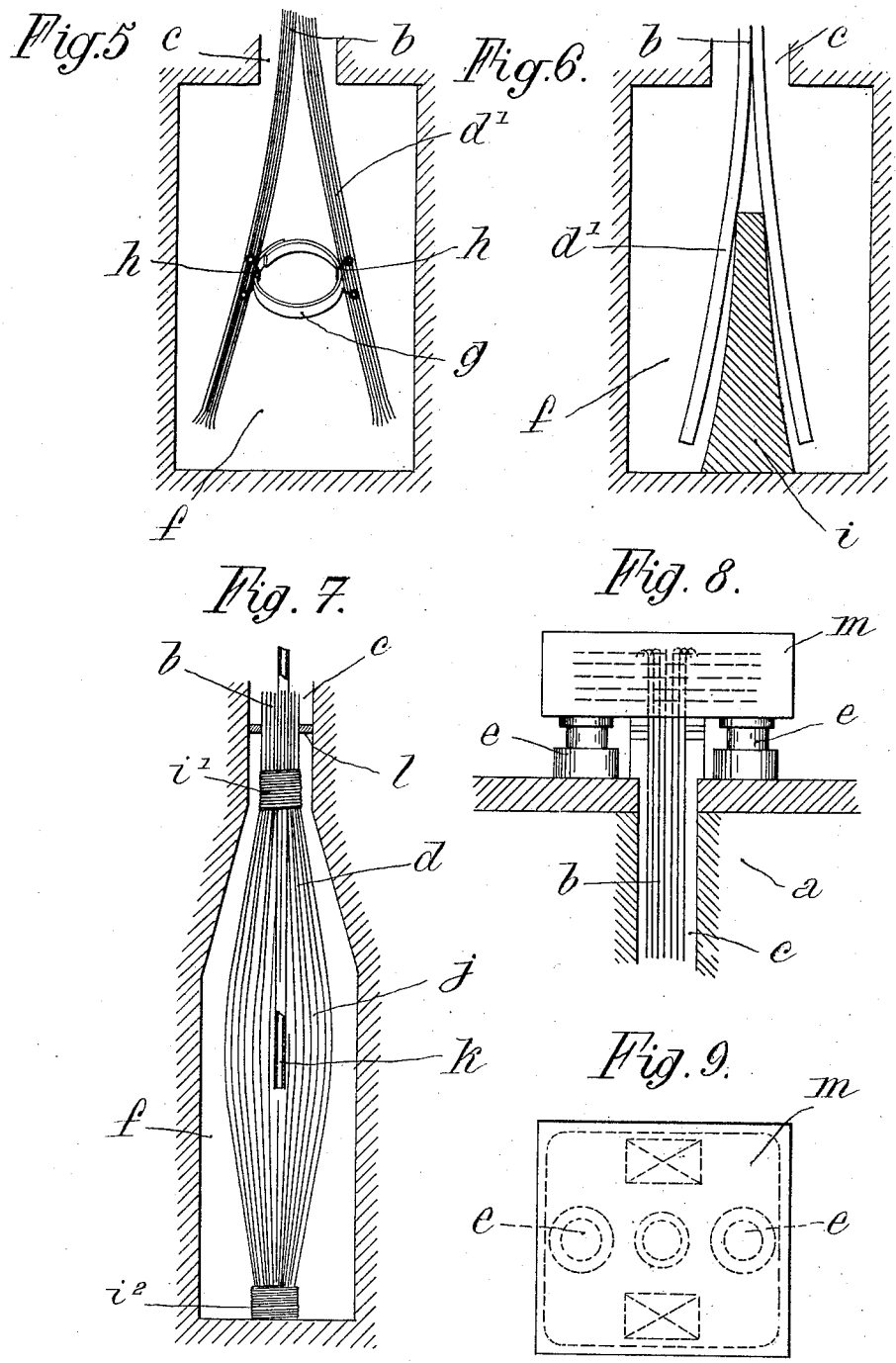

Feb. 7, 1933.　　　　A. COYNE　　　　1,896,810
REENFORCED AND ANCHORED MASONRY STRUCTURE
Filed April 18, 1930　　　6 Sheets-Sheet 4

André Coyne
Inventor
by Louis Barnett
Attorney.

Feb. 7, 1933. A. COYNE 1,896,810
REENFORCED AND ANCHORED MASONRY STRUCTURE
Filed April 18, 1930  6 Sheets-Sheet 5

André Coyne
Inventor
by Louis Barnett
Attorney.

Feb. 7, 1933.   A. COYNE   1,896,810
REENFORCED AND ANCHORED MASONRY STRUCTURE
Filed April 18, 1930    6 Sheets-Sheet 6

André Coyne
Inventor
by Louis Barnett
Attorney

Patented Feb. 7, 1933

1,896,810

UNITED STATES PATENT OFFICE

ANDRÉ COYNE, OF PARIS, FRANCE

REENFORCED AND ANCHORED MASONRY STRUCTURE

Application filed April 18, 1930, Serial No. 445,297, and in Morocco April 24, 1929.

The present invention relates to re-enforced and anchored masonry structures and to methods for constructing the same.

One of the objects of the invention is to provide an anchored or re-enforced masonry structure (concrete, cement or the like) in which the re-enforcing or anchoring elements are imbedded in the masonry under tension.

Another object is to provide novel methods for constructing anchored masonry.

Further objects will appear in the course of the detailed description now to be given with reference to the accompanying drawings, in which:

Fig. 5 shows, diagrammatically, a first method of anchoring the distal extremity of a re-enforcing element;

Fig. 6 represents a second method of anchoring;

Fig. 7 illustrates a third method of sinking an anchor;

Fig. 8 shows how the re-enforcing or anchoring elements may be placed under tension;

Fig. 9 is a plan of the assembly shown in Fig. 8;

Figure 1:
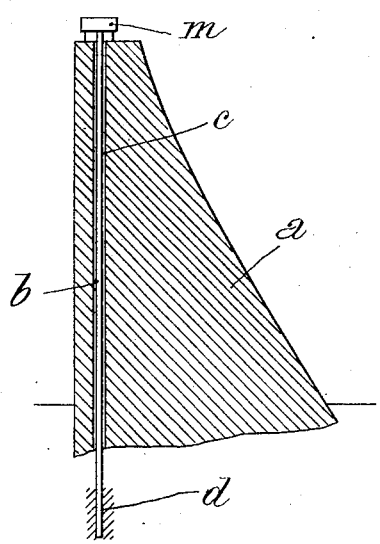
Figs. 1 to 4 are sections through dams illustrating four different forms of anchorage for the latter.
Figure 2:
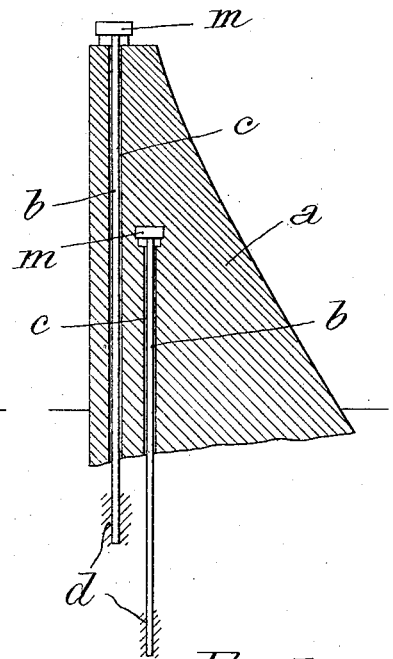
Figure 3:
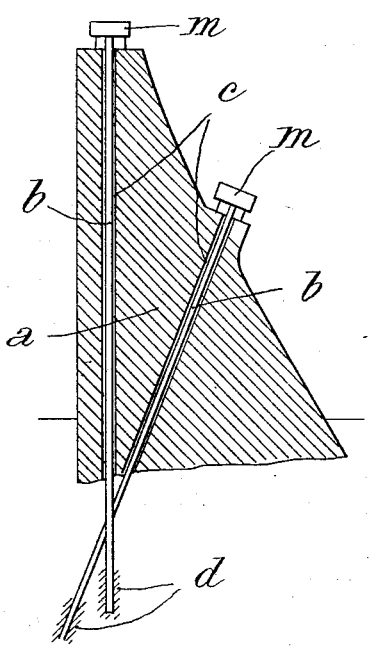
Figure 4:
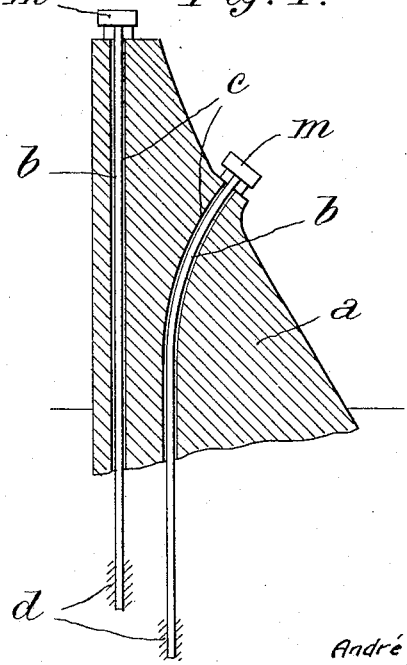
Figure 10:
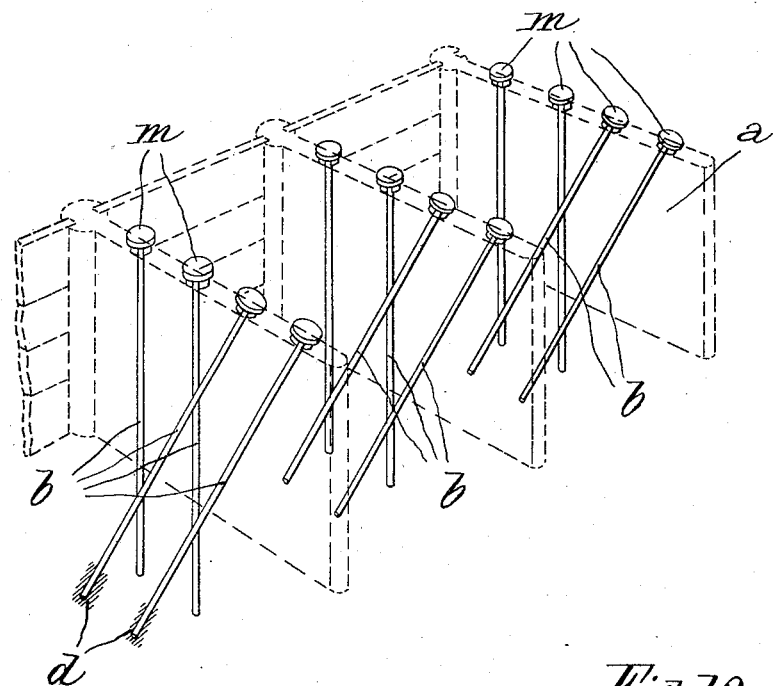
Fig. 10 is a skeleton diagram of a masonry structure provided with anchoring elements under tension.

Referring to the various figures of the drawings, there is shown a masonry or concrete wall, dam or the like $a$ constructed in the usual way and having openings $c$ formed therethrough,—a rod or rods $b$ anchored at $d$ and maintained under tension by being (1) submitted to the tractive effort of hydraulic jacks $e$ (Fig. 8), the free extremities or rods $b$ being embedded in a re-enforced concrete block $m$ receiving the thrust of the jacks and then (2) sealed under tension by pouring a very liquid cement mixture into the space between rods $b$ and the walls of openings $c$ and awaiting the setting of the cement mixture,— and elements $m$ capping the free extremities of rods $b$.

Rods $b$ may be made up in the form of round bars, tubes, or better still, of bundles of steel wire or piano cords. The rods, tubes, or wires may be plated, coated, or otherwise treated to diminish their corrodibility or may be composed of a difficultly oxidizable or corrodible metal or alloy. Bundles of Thomas steel wire having an elastic limit of 80 kgs., rupturing under a load of 110 kgs., and having an elongation of 7% are found to yield excellent results.

In proceeding to build a dam, dry-dock, retaining wall or other masonry structure, a portion or the whole of the concrete body $a$ may be poured and rods $b$ prepared for anchoring in any of the following ways:—

A chamber $f$ is first formed at the base of any opening $c$ by means of ($a$) an excentrically rotating drill, ($b$) a trepanning tool of any kind ($c$) a water-jet under high pressure or ($d$) an acid or other chemical substance; a solid bar is then introduced (Figs. 1 to 4), or a pair of rods (Fig. 6) are moved downward so as to straddle a wedge $i$ previously lowered into chamber $f$ (wedge $i$ may be placed in position before the pouring of mass $a$), or (Fig. 5) a bundle of wires $d^1$ are fitted with a collapsible steel ring $g$ passing through a pair of loops $h, h$, ring $g$ acting to spread wires $d^1$ as soon as the wire bundle enters chamber $f$, or (Fig. 7) a bundle of wires $d$ are ligatured at $i^1$ and $i^2$ so that, when compressed, a fusiform body $j$ is formed, filling part of chamber $f$, a tube $k$ being placed inside the bundle to insure introduction of cement both inside and outside $j$; a liquid mixture of cement is then poured into chamber $f$ via the interstice between $b$ and the walls of $c$ (Figs. 1 to 6) or through tube $k$ (Fig. 7) and allowed to harden; the free extremity or extremities of element $b$ are then embedded in re-enforced concrete block $m$ (by pouring into a box of appropriate form); finally, jacks $e$ are brought to bear against the bottom of the block $m$ and, while elements $b$ are still under tension, a cement mixture is poured into the space between $b$ and the walls $c$ while tapping on rod $b$ with a pneumatic hammer to insure descent of the cement. Once the cement has hardened, rods $b$ thus anchored under tension may be capped with elements $m$ and exert a pull on mass $a$ permitting the latter to resist the strains and fatigue to which it may be subjected.

Figure 21:
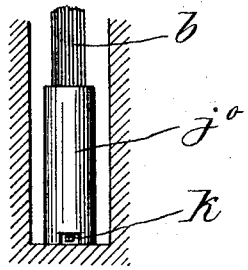

It is not absolutely necessary to form an enlarged chamber $f$. Rods $b$ may be anchored at one end in an opening $c$ continuous with a chamber $f$ of like section or rod $b$ containing a central tube $k$ may be embedded in a cement cylinder $j^0$ and the latter may be anchored by pouring cement through tubes $b$ (Fig. 21).

Obviously, rods $b$ need not traverse the whole of mass $a$. The latter may, for example, be poured to a certain height, then after the sealing of one rod $b$ under tension (Fig. 2), its height may be extended and a second rod $b$ may be sealed therein under tension in the manner already described.

Figure 11:
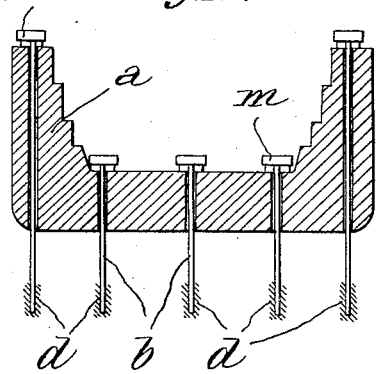
Fig. 11 illustrates the invention applied to a dry-dock.
Figure 17:
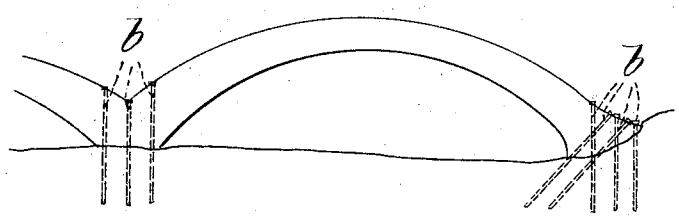
Fig. 17 shows how the anchoring elements should be applied in bridge construction.
Figure 18:
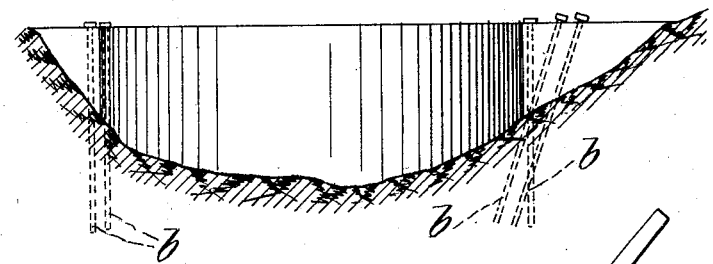
Fig. 18 is an elevation, partially in section, of a curvilinear dam.
Figure 19:
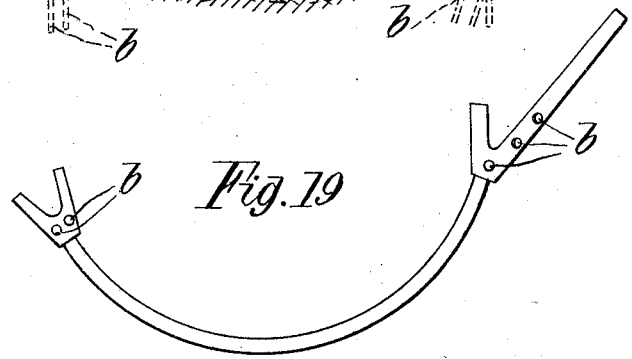
Fig. 19 is a plan of the dam shown in Fig. 18.
Figure 20:
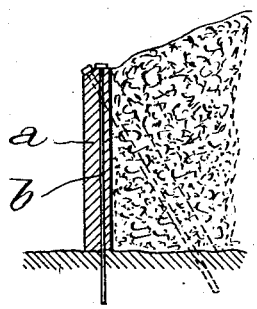
Fig. 20 shows the invention applied to a sustaining wall.

The manner in which rods $b$ are positioned will, of course, vary with the nature and direction of the load. Thus, in dry docks (Fig. 11) and certain forms of dams or retaining walls (Figs. 1 and 2), rods $b$ may be embedded vertically. In other types of dams and in bridges (Figs. 3, 10, 12, and 14 to 20), the rods may be positioned in inclined position to take care of end-thrust (see particularly the bridge structure in Fig. 17) or both vertically and inclined to neutralize the various components of the load acting on the masonry structure.

Naturally, structure $a$ may be composite instead of homogeneous. Thus, rocks and ballast of various kinds may be placed near the base of the latter prior to pouring so as to modify the equilibrium of the mass without changing its exterior form.

Figure 12:
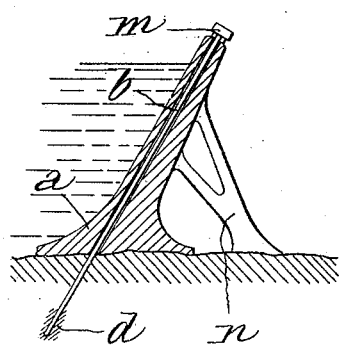
Fig. 12 shows a dam constructed in accordance with the invention.
Figure 13:
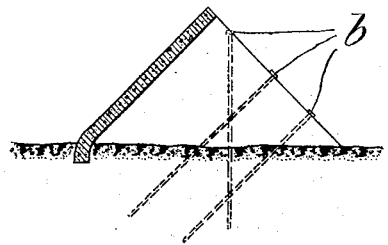
Figs. 13 and 14 represent, in elevation and plan, respectively, another type of dam.
Figure 15:
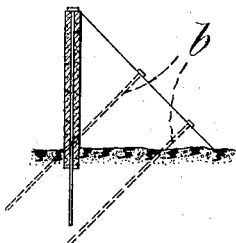
Figs. 15 and 16 illustrate in elevation and plan, still another form of dam.
Figure 14:
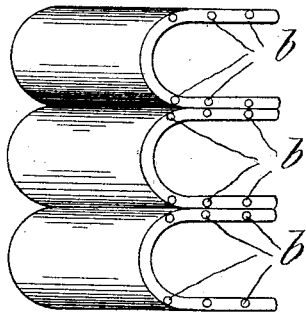
Figure 16:
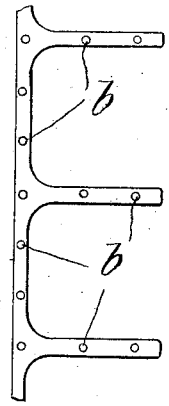

Among the many advantages resulting from the use of masonry anchored by rods under tension, special mention should be made of structures of the type shown in Fig. 12, wherein the dam is sloped towards the water being retained and is supported by elements $n$, rods $b$ functioning to maintain structure $a$ in position.

Obviously, the methods of anchoring rods $b$ may be varied at will. Whatever be the method employed, the anchored end should be fixed sufficiently firmly to permit proper traction to be exerted on the rods.

Figure 22:
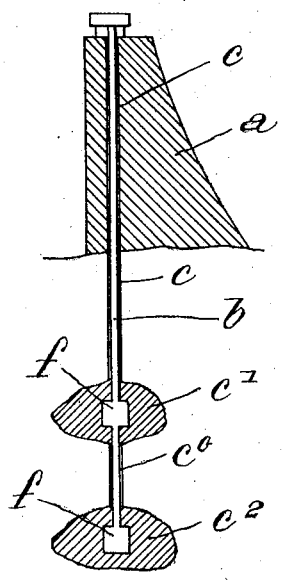
Figs. 21 and 22 represent variants of the anchoring methods illustrated in Figs. 5 to 7.

The method of anchoring shown in Fig. 22 is especially designed for use in sand, clay or other argilaceous foundations in which anchoring by ordinary methods is difficult or impossible. Here, a hole $c$ is bored in the usual way i. e. with the apparatus in current use for oil or artesian wells and, when the drill arrives at a moderate depth, a charge of dynamite or other explosive is exploded to form a chamber $c^1$. A liquid cement mixture is then poured through bore $c$ to fill chamber $c^1$. Once the cement in chamber $c^1$ has hardened, the drilling operation is restarted and a bore $c^0$ is sunk through $c$ to a lower level. Here, a second charge of dynamite is exploded, and chamber $c^2$ thus formed is filled with cement in the same manner as chamber $c^1$.

Finally a pair of chambers $f$ are drilled, trepanned or otherwise formed in $c^1$ and $c^2$ as described for the methods shown in Figs. 5 to 7 and the distal ends of rod $b$ are then expanded and anchored in lower chamber $f$ by any one of the methods already described. If desired, rods $b$ may be roughened or provided with extensions adjacent chamber $c^1$ so as to grip the cement poured into upper chamber. Traction is then exerted on rods $b$ and the assembly is finished as already described.

Figure 23:
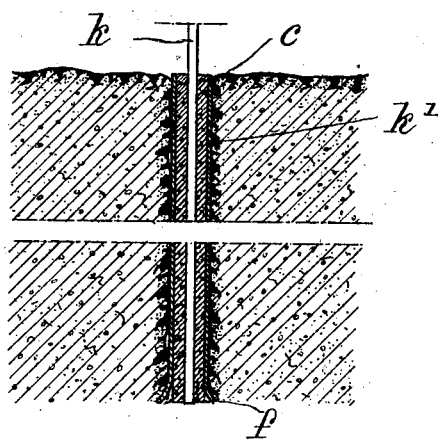
Fig 23 shows still another variant of the anchoring methods illustrated in Figs. 5 to 7.

In the method of anchoring illustrated in Fig. 23; a bore $c$ is made in the usual way and a charge of explosive then tube $k^1$ are lowered thereinto. When an explosion is produced, the lower end of tube $k^1$ spreads and a chamber corresponding to $f$ in the various figures is formed. It suffices then, to flow a liquid cement mixture through the inside of tube $k^1$ to anchor the spread end of the latter in the chamber formed by the explosion, to await hardening, to exert traction on the free end of the tube $k^1$, and to fill the interstice $c$, $k^1$ with cement as already described, to complete the anchoring operation. This method is especially applicable to foundations to be anchored in gravel or the like.

Figure 24:
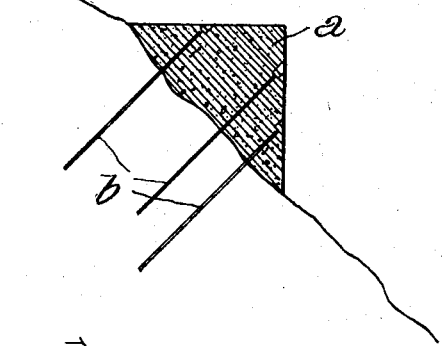
Fig. 24 represents a method for anchoring a supporting structure on a sloping foundation such as a mountain side.

It is the usual practice, in sinking foundations for water-conduits and like structures to be supported on a mountain side, to first cut a series of steps and then plant uprights to take care of the load. As will be seen by reference to Fig. 24, the present invention permits this series of steps to be eliminated. A series of metal anchoring elements $b$ are anchored and sealed in position under tension as already described in a position substantially normal to the mountain side and maintain a concrete or other masonry support $a$ under tension against the latter. A water-conduit or other load may then be mounted on the horizontal supporting surface of $a$.

Figure 25:
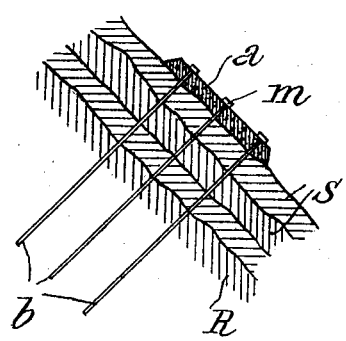
Fig. 25 shows the invention applied to the anchoring of a foundation in slipping ground.

The anchoring method shown in Fig. 25 is designed to provide a secure foundation on ground subject to slippage of subjacent strata S, S. Here, bores $c$ are sunk to rock-bottom R not subject to slippage and rods $b$ are anchored and sealed in place under tension in the usual way. A foundation or other masonry structure $a$ will thus be held securely in place despite slippage of strata S, S.

The invention is not to be taken as limited to the methods or structures shown in any particular figure; thus, any one of the anchoring methods shown in Figs. 5 to 7 and 21 to 23 may be selected at will to anchor masonry structures of any form whatever; elements $b$ may be tubular, or of twisted or straight wire; element $m$ may be screwed, welded, soldered or otherwise fixed on the proximal extremities of elements $b$; the distal extremities of elements $b$ may be sealed in place by means of bitumen, asphalt or any other solidifiable substance instead of cement.

What I claim is:

1. The method of anchoring a masonry structure comprising the steps of constructing a masonry mass, passing a metallic anchoring element through said mass, fixing one end of said anchoring element rigidly in position, submitting said anchoring element to a tractive force, and bonding said masonry mass and said anchoring element together along the greater part of the length of the latter while said anchoring element is under the action of said tractive force.

2. A masonry structure formed by passing an anchoring element through a masonry mass, fixing one end of said anchoring element rigidly in place, subjecting said anchoring element to a tractive force, bonding said masonry mass and anchoring element along the greater part of the length of the latter while said anchoring element is being subjected to the tractive force.

3. The method of anchoring a masonry structure comprising the steps of constructing a masonry mass having an opening therethrough, passing an anchoring element through said opening, rigidly cementing the distal extremity of said anchoring element in position, exerting a tractive force on the anchoring element, and pouring a cement mixture into said opening containing the anchoring element while the latter is under tension, whereby the anchoring element and masonry mass are bonded together.

4. The method of anchoring in sliding ground comprising the steps of sinking a bore through said sliding ground to rock bottom, cementing the distal end of a metallic anchoring element in rock-bottom, submitting said anchoring element to tension and bonding said anchoring element while under tension in place in said bore.

5. The method of anchoring a masonry mass on sloping ground comprising the steps of anchoring the distal extremities of a plurality of metallic anchoring elements in the earth so that the latter are substantially normal to the sloping ground, subjecting said anchoring elements to tension, and bonding the anchoring elements in place while still under tension.

6. In combination, a masonry mass, anchoring means composed of a bundle of tensioned piano cords traversing said masonry mass and bonded thereto, and means associated with said piano cords for maintaining said cords under a tension sufficient to cause the cord to remain bonded to said masonry mass and to exert its anchoring effect with repeated expansion and contraction of the masonry mass.

7. In combination, a masonry mass, a reinforcing and anchoring tensioned element traversing said masonry mass and bonded thereto, said element having an elastic limit superior to 40 kilograms per square millimeter, and means associated with said element maintaining said element under a tension sufficient to cause the element to remain bonded to said masonry mass and to exercise its reenforcing and anchoring effects with repeated expansion and contraction of the masonry mass.

In testimony whereof I affix my signature.

ANDRÉ COYNE.